(12) United States Patent
Blanchard et al.

(10) Patent No.: US 8,139,162 B2
(45) Date of Patent: Mar. 20, 2012

(54) RAPID TELEVISION CHANNEL SCAN USING FREQUENCY PLANS TO IDENTIFY CHANNELS

(75) Inventors: Robert Blanchard, Escondido, CA (US); Robert L. Hardacker, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 629 days.

(21) Appl. No.: 12/380,700

(22) Filed: Mar. 3, 2009

(65) Prior Publication Data

US 2010/0225830 A1    Sep. 9, 2010

(51) Int. Cl.
*H04N 5/50* (2006.01)
*H04N 5/445* (2011.01)
(52) U.S. Cl. .......................................... 348/732; 725/38
(58) Field of Classification Search .................. 348/731, 348/732, 570, 191, 725; 725/38, 59; 455/226.1, 455/161.1, 161.2, 161.3, 166.1, 166.2
See application file for complete search history.

(56) References Cited

U.S. PATENT DOCUMENTS

| 5,087,977 | A  | * | 2/1992  | Suizu ............................. 348/732 |
| 5,659,352 | A  | * | 8/1997  | Lee ............................... 725/151 |
| 6,064,449 | A  |   | 5/2000  | White et al. |
| 6,297,858 | B1 | * | 10/2001 | Yang .............................. 348/731 |
| 6,864,926 | B2 | * | 3/2005  | Ohmatsu ........................ 348/731 |
| 7,080,393 | B2 | * | 7/2006  | Morisada et al. ............... 725/38 |
| 7,113,230 | B1 |   | 9/2006  | Genovese et al. |
| 2003/0163830 | A1 | * | 8/2003 | Nam .............................. 725/120 |
| 2004/0244048 | A1 | * | 12/2004 | Wada et al. .................... 725/120 |
| 2005/0076385 | A1 |   | 4/2005 | Li et al. |
| 2005/0114889 | A1 | * | 5/2005 | Liu et al. ........................ 725/53 |
| 2008/0117338 | A1 |   | 5/2008 | Chang et al. |
| 2008/0278634 | A1 |   | 11/2008 | Huang |
| 2010/0165214 | A1 | * | 7/2010 | Strater et al. .................. 348/732 |

FOREIGN PATENT DOCUMENTS

| KR | 10-1999-0042299 A | 6/1999 |
| KR | 10-2006-0007163 A | 1/2006 |
| KR | 10-2006-0011412 A | 2/2006 |

OTHER PUBLICATIONS

"CEA Standard, Cable Television Channel Identification Plan, CEA-542-B," Consumer Electronics Association, Jul. 2003.
International Search Report for PCT/US2010/025777.

* cited by examiner

*Primary Examiner* — Victor Kostak
(74) *Attorney, Agent, or Firm* — Miller Patent Services; Jerry A. Miller

(57) ABSTRACT

In accord with embodiments and implementations consistent with the present invention, rather than perform a full scan of every frequency to find a channel, the tuner is programmed to find a reasonable sample of channels. For example, the tuner can search for at least two or three (generalized as N) channels to determine the frequency plan of the channels (by virtue of detection of at least one channel) and then use one of the known plans to directly identify the frequency map. The process can then step quickly through each frequency, without optimizing or fine tuning each channel, to determine the existence of a channel. With this process the number of tunable channels is found quicker and the initial setup time is shortened.

23 Claims, 4 Drawing Sheets

RAPID TELEVISION CHANNEL SCAN USING FREQUENCY PLANS TO IDENTIFY CHANNELS

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Typical acquisition times for channel maps or available television (TV) channels, whether the source is over-the-air (OTA) or cable, can take a considerable amount of time. In some instances, up to fifty minutes or so has been noted for such acquisition. This can be annoying to the user who wishes to get started using a television when acquired or when a new service is obtained.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
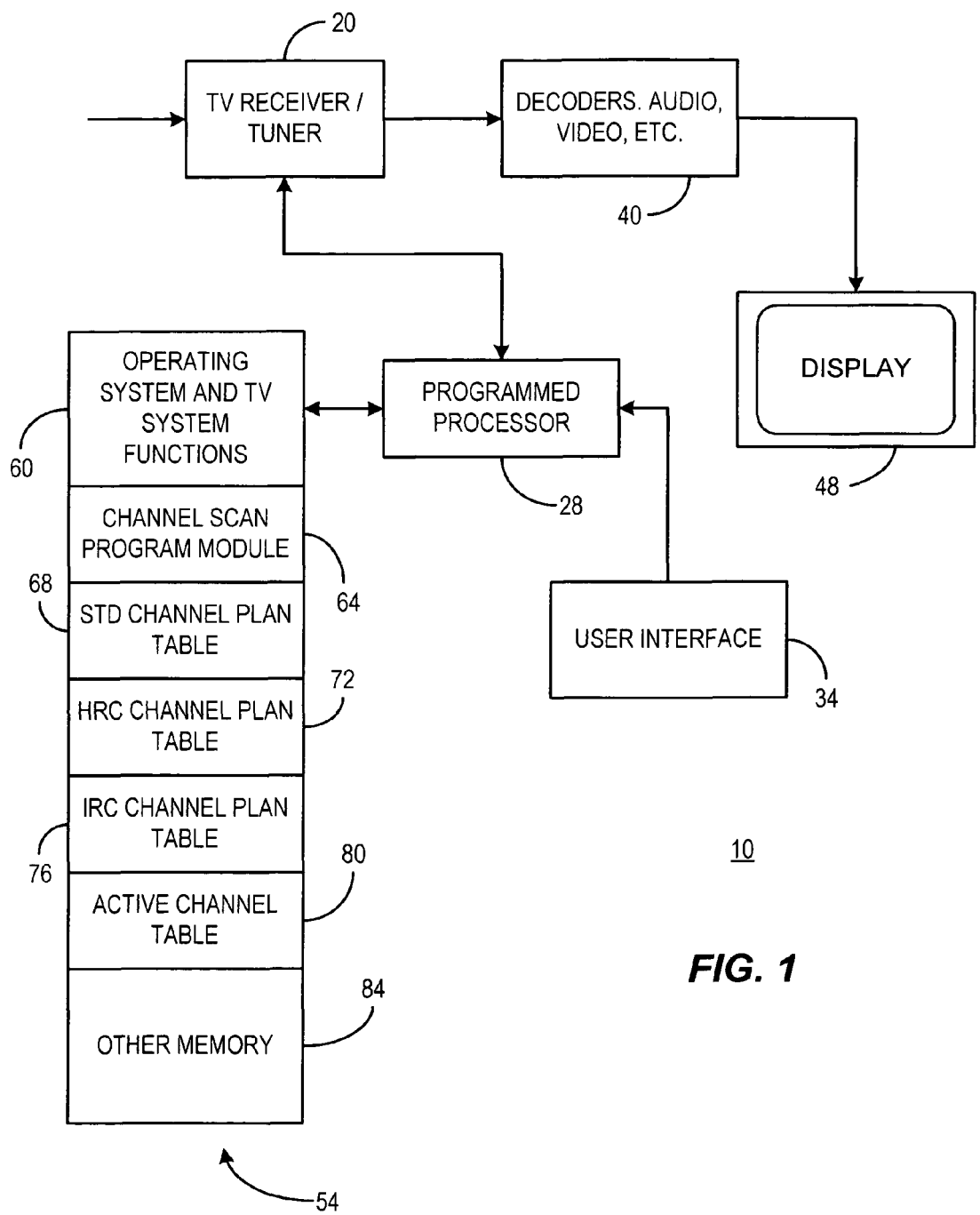
FIG. 1 is a block diagram of an example television receiver device consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on and executing on a processor. The term "processor", "controller", "CPU", "computer" and the like as used herein encompasses both hard programmed, special purpose, general purpose and programmable devices and may encompass a plurality of such devices or a single device in either a distributed or centralized configuration without limitation.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

TVs typically tune to one of three types of channel plans for cable service and one plan for over-the-air transmission. These channel plans are defined in CEA standard CEA-542-B, "Cable Television Channel Identification Plan, July 2003 from the Consumer Electronics Association, which is hereby incorporated by reference. The channel plans are defined therein as "Standard" (STD), "Harmonic Related Carriers" (HRC), and "Incremental Carriers" (IRC). STD is used for both over-the-air and many cable services. Acquisition times are often long and in the case of a TV that is connected to both an antenna and a cable service the channel scan at initial setup takes considerable time. These methods are for a traditional single tuner TV.

In accord with embodiments and implementations consistent with the present invention, rather than perform a full scan of every frequency to find a channel, the tuner is programmed to find a reasonable sample of channels. For example, the tuner can search for at least two or three (generalized as N) channels to determine the frequency plan of the channels (by virtue of detection of at least one channel) and then use one of the known plans to directly identify the frequency map. The process can then step quickly through each frequency, without optimizing or fine tuning each channel, to determine the existence of a channel. With this process the number of tunable channels is found quicker and the initial setup time is shortened.

When the user tunes to a channel, the tuner can optimize or fine tune at that instance, storing the optimized value in the channel map table.

In addition, the TV can, either when it is turned off or in standby mode, return to the known channels to optimize or fine tune the channel; and gather additional information that might be useful.

For purposes of this document, the terms "background function", "background process" or the like refers to a process that is carried out using surplus resources while the television receiver device is idle or carrying out other processes. Such other processes may include presenting program material (provided the TV has multiple tuners), displaying video that does not require the tuner, displaying graphics images or displaying still images from a storage device. When a TV is idle, this can correspond to the television being in a lower power "sleep" mode or turned off (which generally means that the TV is actually in a standby mode).

Turning now to FIG. 1, a simplified block diagram of a television system consistent with certain implementation is depicted as 10. Those skilled in the art will appreciate that this system is shown in abbreviated form in order to avoid obscuring the present disclosure with conventional components. In this system, a TV receiver and tuner are depicted generally as 20. Receiver/tuner (or simply tuner) 20 operates under control of programmed television processor 28 with the user providing input via a user interface depicted as 34 which generally includes a remote control and remote control receiver as well as television mounted controls.

Once tuned by the tuner 20, the tuned channel data signals are presented to video and audio decoders, display drivers, etc. shown generally as 40. These circuits 40 present the video information to the display drivers and display 48 for presentation to the viewer.

The programmed processor utilizes accompanying storage devices which may include volatile and non-volatile memory shown collectively as memory 54 (even though multiple physical devices of multiple types may be used). Memory 54 is used to store an operating system as well as the programs which enable system functions of the television set shown as 60. The channel scanning program module is depicted as 64 and is stored for use by the processor 28 when channel scan operations are carried out. The three CEA-542-B channel plans STD, HRC and IRC are stored as tables in the memory 54 as 68, 72 and 76. In accord with certain embodiments consistent with the present invention, an additional table 80 is provided which is populated during a scan with active channels as identified during the scan. Other memory for working memory and other television related processor programs, attributes and data is provided as 84.

Figure 2:
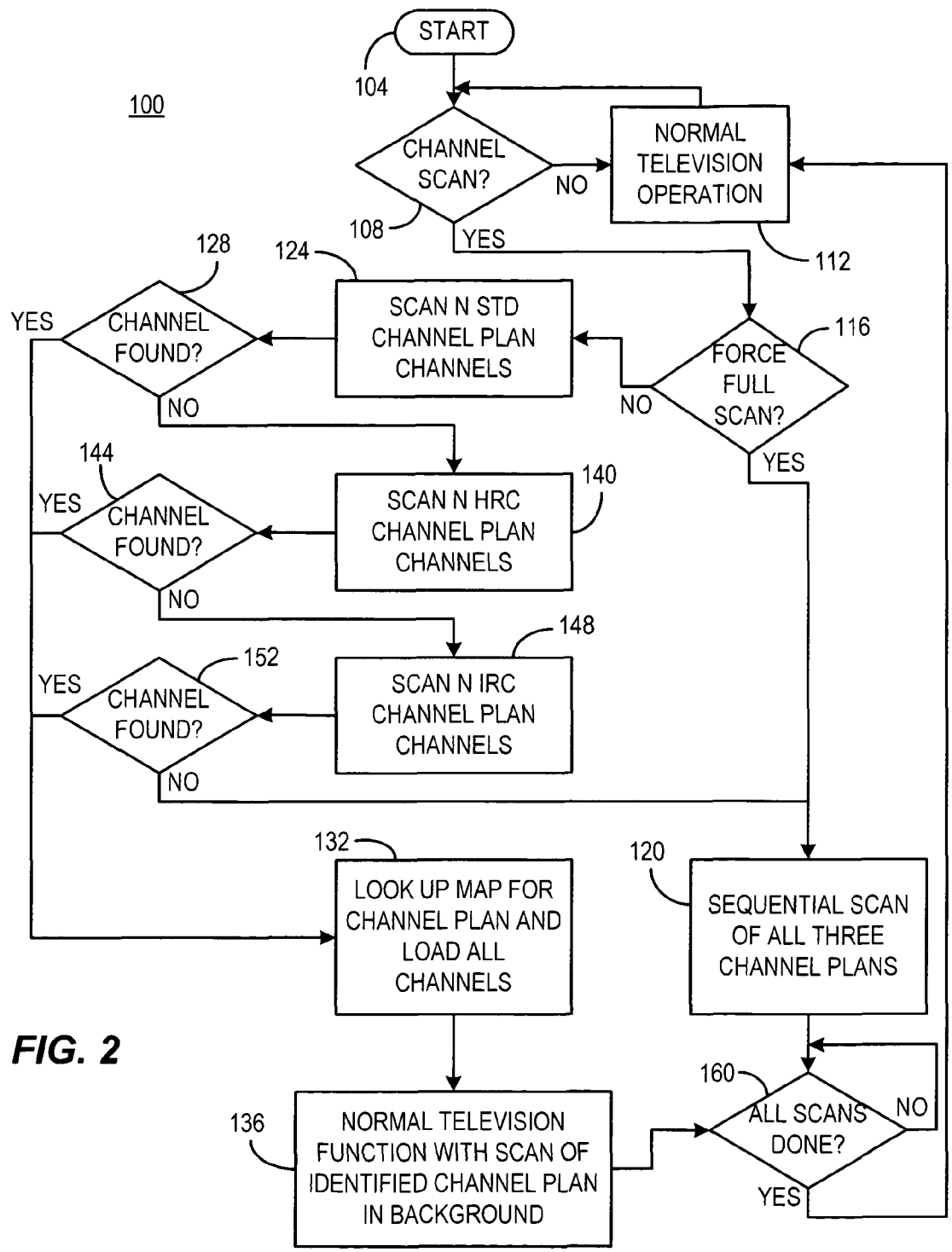
FIG. 2 is a flow chart of an example implementation of a rapid channel scanning process consistent with certain embodiments of the present invention.

FIG. 2 depicts an example implementation of an embodiment of a channel scan process 100 used for illustrative purposes starting at 104. In this implementation, a determination is made as to whether a channel scan is to be performed at 108. Such determination may be user initiated, or may be programmed to occur when the television is powered up for the first time after leaving the factory. If no channel scan is needed, normal television operation is presumed at 112 which may include television viewing operations as well as idle or standby modes.

In certain embodiments, it may be desirable, despite the potential of a long wait, to force the television receiver device to do a full scan of all three channel plans at 116, and if this option is elected by the user at 116, the television proceeds with a sequential scan of all possible channels in all three channel plans at 120. However, if the more rapid scan process consistent with the present implementation is elected at 116 by virtue of not forcing a full scan, the system first scans N (e.g., three representative channels that are commonly used) of the STD channels in the STD channel plan at 124. This is used as a test to determine by sampling if there are any STD channels available that are detected. If at least one channel is found at 128, it can be determined (assuming only a single RF source for the television content) that the source uses the STD channel plan. Control can then be passed to 132 where the channel map for the STD channel plan is loaded so as to load all channels in the channel plan as available for tuning.

It is noted that not all channels in this channel plan may be available depending on the provider (or location in the case of over the air programming), however, the user can immediately begin to watch television and tune to a desired channel. When a channel is tuned, the tuner can carry out a fine tuning process to optimize the tuning of that particular channel and store the optimized values (e.g., channel frequency) in memory for next time the channel is accessed.

Control then passes to 136 where normal television operational functions are carried out. In the event of additional resources being available as a result of idle time or the television having multiple tuners, the identified channel plan is carried out as a background operation at 136 so as to eliminate unavailable channels and fine tune the available channels. Memory is updated with these parameters as the channels are scanned in the background. In this manner, one can immediately begin using the television set and the channel scan can quietly update when the TV is turned off or used for viewing videos, still images or in full use if there are multiple tuners.

Returning to 128, if no channels are found, it is presumed that the STD channel plan is not the plan in use. In this case, a similar process is carried out at 140 where N (or another small number) of channels are scanned for the HRC channel plan. If at least one channel is found at 144, control passes to 132 where the HRC channel plan is loaded as the available channels in much the same manner discussed above in connection with the STD channels. Again, normal TV functions are carried out at 136 while a background operation refines the channel list and the fine tuning of the channel for later use.

Returning to 144, if no channels are found, it is presumed that the STD channel plan is not the plan in use. In this case, a similar process is carried out at 148 where N (or another small number) of channels are scanned for the IRC channel plan. If at least one channel is found at 152, control passes to 132 where the HRC channel plan is loaded as the available channels in much the same manner discussed above in connection with the STD channels. Again, normal TV functions are carried out at 136 while a background operation refines the channel list and the fine tuning of the channel for later use.

If no channels are found either at 128, 144 or 152, it can be concluded that there is either a technical problems prohibiting reception of the channels, or the sample of N channels was too small and failed to identify the channel plan. In this case, several possible corrective actions can be implemented, but the present implementation implements a full scan of all three channel plans at 120. In either case of 136 or 120, when all scans are completed at 160, the television reverts to normal operation at 112.

Channels can be loaded using any suitable method that results in a set of channels being available for use by the user. For example, another channel table can be generated with valid channels, or, one or more of the channel plan tables can be edited to provide an attribute or indicator that a channel is active or inactive. Other techniques will occur to those skilled in the art upon consideration of the present teachings. When a channel plan is stored to memory, it can be stored with the default channel values as specified in CEA-542-B as a starting point, with refinement by fine tuning taking place later as will be described.

In certain preferred implementations, the N channels that are initially scanned for each channel plan should meet the following criteria, but it should be emphasized that meeting these criteria is not necessary to the implementations of embodiments consistent with the claims. One criterion is that the channels selected from each plan should be far enough away in frequency from channels in other channel plans so that there can be little doubt that when a channel is identified it indeed belongs to the channel plan being scanned. Another criterion is that the channels selected from each plan should be far away from sources of interference. For example, standard channels 3 and 4 are commonly used as output channels for video sources and may potentially cause false positive detections. Similarly, standard channel 6 is close to the FM band which potentially could result in false positive detections. Desirably, the number N of channels sampled should be enough to assure detection from all possible cable television systems (or other sources such as satellite systems). In keeping with this desire, lower numbered channels are most commonly used by cable television systems and with the above exceptions are good candidates. Further, desirably, the set of N channels should encompass the channels with the highest statistical probability of being used in the marketplace by all available cable operators.

While the present disclosure has used an example wherein N (for example 3) channels are sampled from each of the three channel plans, this should not be considered limiting. Upon further exploration, it may be desirable (by way of example) to only search for three channels on one channel plan, but to search for four channels on the other channel plans. To generalize, it is consistent with the present teachings to scan for N channels in the STD plan, M channels in the HRC plan and P channels in the IRC plan, where M, N and P are small positive integers which represent enough channels to adequately sample the channel plan to discover the presence or absence of channels on that plan.

Once one or more channels are detected in any channel plan, the user can immediately begin tuning to channels. If certain channels are not used, they will still be tunable but will produce no content until the process completes scanning the channel plan to exclude unused channels. But, the user will find that he or she can very quickly tune to available channels without having to wait for a full scan to be completed. Hence, the user can begin to utilize the TV within a minute or two of the beginning of the scanning process.

Figure 3:
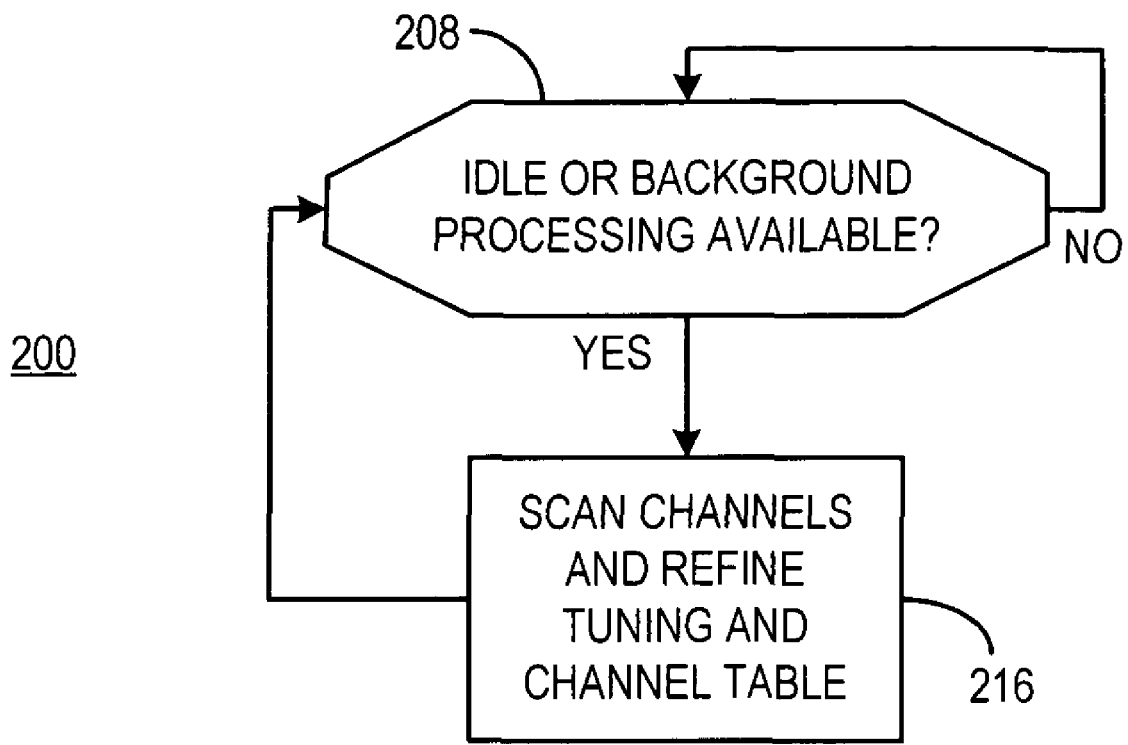
FIG. 3 is a flow chart of an example implementation of a process of background scanning consistent with certain embodiments of the present invention.

Referring to FIG. 3, an example channel scan process used during idle time or background scanning is depicted as process 200. At 208, the processor determines if the system is idle (or a tuner is available) and if so, the current channel plan is scanned for channels at 216. For those channels found to be available, fine tuning is carried out and the fine tuning parameters (i.e., frequency settings) are stored to memory. For channels that are not being used in the channel plan, their entry in the table can be deleted to simplify tuning. This process can continue whenever possible to complete a full scan and fine tuning of the channel plan. The process may also be repeated at reasonable intervals of time to assure that any channel drift at the transmitter or receiver is accounted for in the fine tuning. Additionally, whenever a particular channel is selected for viewing (or when it is selected for the first time in a scan process), the channel's fine tuning can be done and the fine tuning parameters stored to memory for use next time the channel is tuned.

Figure 4:
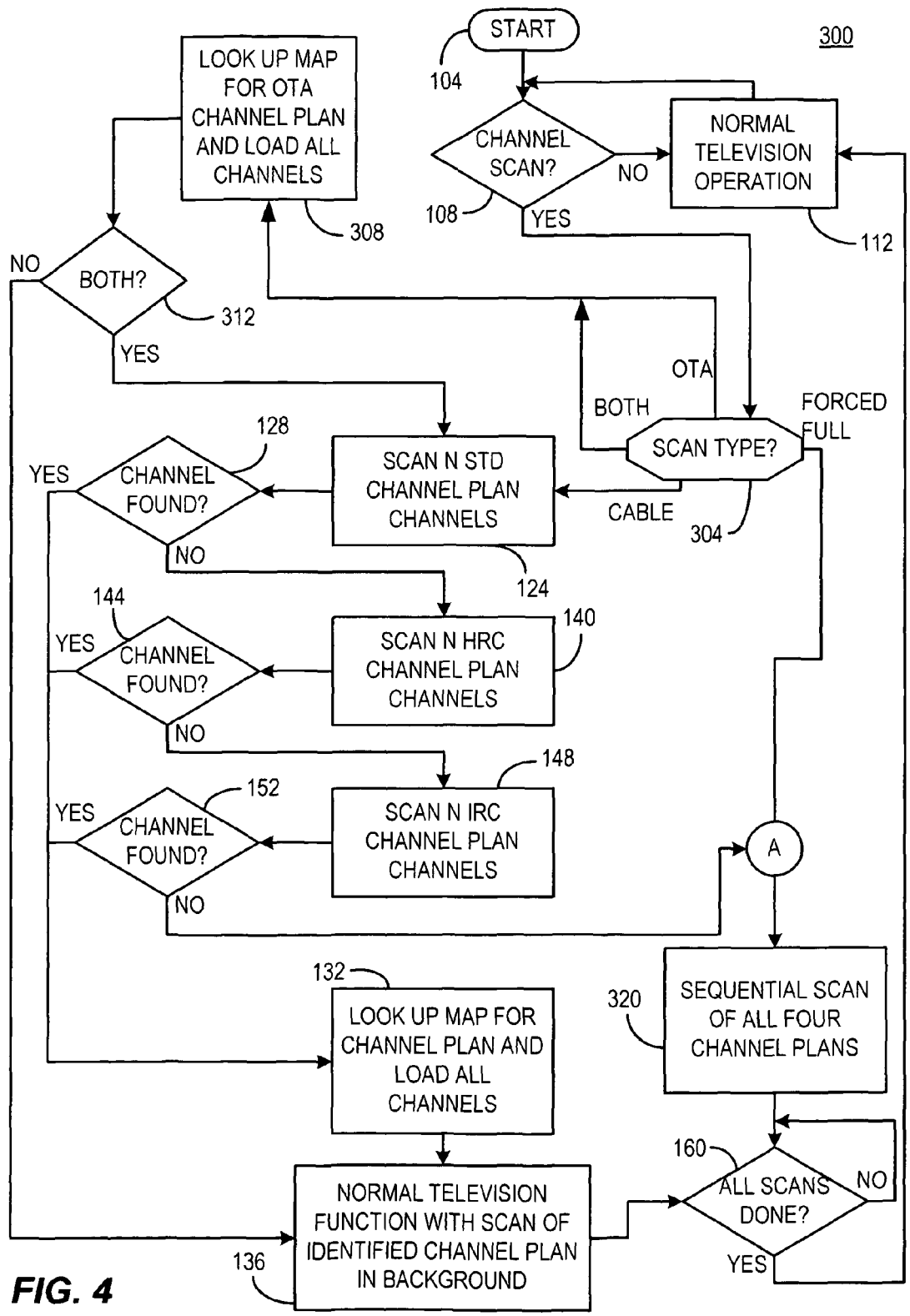
FIG. 4 is a flow chart of another example implementation of a rapid channel scan process consistent with embodiments of the present invention.

FIG. 4 depicts a variant of the scanning process of FIG. 2, shown here as process 300. In the process 100, the basic scanning process for cable television channel plans is depicted. This process can be expanded upon to account for over the air (OTA) channels. Like reference numerals in processes 100 and 300 depict like process elements in these variants. In process 300, if a channel scan is to be implemented at 108, the user is presented with display of a menu option at 304 wherein the user determines if the scan he seeks is one of three or four options including a cable plan scan, an over the air channel plan scan, both or a full scan. If the user elects either a cable only channel scan, the process is essentially identical to that of the example implementation of process 100 of FIG. 2. However, if the user elects either an over the air scan or both cable and over the air, control passes to 308.

In certain implementations, the OTA channels can be scanned in a manner similar to the scans previously discussed. However, in this implementation, the OTA channel map is simply looked up and loaded at 308. This gives the user the ability to immediately tune to any desired OTA channel. This map can then be updated in the background as a fine tuning and deleting process as was described previously with the cable channel plans at 136.

If the user elects both cable and OTA scans at 312, control passes to 124 where the cable sampling process depicted in 100 is carried out as previously described. If the user has elected only an OTA scan, control passes through 312 to 136 and as the user tunes or as channels are scanned in the background, channels without a signal are deleted and those with a signal are fine tuned, with this data being updated in memory.

If a forced full scan is elected at 304, control passes to 320 where, rather than all three cable plans are scanned as in 120, all three cable channel plans plus the OTA plan are scanned at 320.

Many variations will occur to those skilled in the art upon consideration of the present teachings.

Thus, a television channel scan method consistent with certain implementations involves selecting a first CEA-542-B compliant channel plan; scanning a plurality of N frequencies of the first CEA-542-B compliant channel plan to determine if any channel was detected by sequentially tuning the channels at a tuner; if at least one channel of the CEA-542-B compliant channel plan was detected, selecting all channels from the first CEA-542-B compliant channel plan as channels available for a user to tune; if no channels were detected in the N frequencies of the first CEA-542-B compliant channel plan, then selecting a second CEA-542-B compliant channel plan; scanning a plurality of N frequencies of the second CEA-542 compliant channel plan to determine if any channel was detected by sequentially tuning the channels at the tuner; if at least one channel of the CEA-542-B compliant channel plan was detected, selecting all channels from the second CEA-542-B compliant channel plan as channels available for a user to tune; if no channels were detected in the N frequencies of the second CEA-542-B compliant channel plan, then selecting a third CEA-542-B compliant channel plan; scanning a plurality of N frequencies of the third CEA-542-B compliant channel plan to determine if any channel was detected by sequentially tuning the channels at the tuner; if at least one channel of the CEA-542-B compliant channel plan was detected, selecting all channels from the third CEA-542-B compliant channel plan as channels available for a user to tune; and wherein N is a positive integer.

In certain implementations, if no channels were detected in the N frequencies of the first, second and third CEA-542-B compliant channel plan, then carrying out a complete channel scan of all channels in all three CEA-542-B compliant channel plans. In certain implementations, the method further involves storing the selected channels in a memory device. In certain implementations, the method further involves storing an attribute for each channel selected in a memory device. In certain implementations, the method further involves carrying out a scan of the selected channel plan as a background function to refine the tuning of each available channel in the selected channel plan. In certain implementations, the CEA-542-B compliant channel plans comprise STD, HRC and IRC channel plans. In certain implementations, the selected channels are stored with default frequency values. In certain implementations, further comprising fine tuning the channels in the frequency plan to refine the default frequency values. In certain implementations, the fine tuning is carried out when a user selects a channel for viewing from the channel plan. In certain implementations, the method further involves loading an over the air (OTA) channel plan to memory.

In another embodiment, a television channel scan method involves selecting a first CEA-542-B compliant channel plan; scanning a plurality of N frequencies of the first CEA-542-B compliant channel plan to determine if any channel was detected by sequentially tuning the channels at a tuner; if at least one channel of the CEA-542-B compliant channel plan was detected, selecting all channels from the first CEA-542-B compliant channel plan as channels available for a user to tune; if no channels were detected in the N frequencies of the first CEA-542-B compliant channel plan, then selecting a second CEA-542-B compliant channel plan; scanning a plurality of M frequencies of the second CEA-542 compliant channel plan to determine if any channel was detected by sequentially tuning the channels at the tuner; if at least one channel of the CEA-542-B compliant channel plan was detected, selecting all channels from the second CEA-542-B compliant channel plan as channels available for a user to tune; if no channels were detected in the M frequencies of the second CEA-542-B compliant channel plan, then selecting a third CEA-542-B compliant channel plan; scanning a plurality of P frequencies of the third CEA-542-B compliant channel plan to determine if any channel was detected by sequentially tuning the channels at the tuner; and if at least one channel of the CEA-542-B compliant channel plan was detected, selecting all channels from the third CEA-542-B compliant channel plan as channels available for a user to tune; and wherein N, M and P are positive integers.

In certain implementations, if no channels were detected in the P frequencies of the first, second and third CEA-542-B compliant channel plan, then carrying out a complete channel scan of all channels in all three CEA-542-B compliant channel plans. In certain implementations, the method further involves storing the selected channels in a memory device. In certain implementations, the method further involves storing an attribute for each channel selected in a memory device. In certain implementations, the method further involves loading an over the air (OTA) channel plan to memory. In certain implementations, the method further involves carrying out a scan of the selected channel plan as a background function to refine the tuning of each available channel in the selected channel plan. In certain implementations, wherein the CEA-542-B compliant channel plans comprise STD, HRC and IRC channel plans. In certain implementations, the selected channels are stored with default frequency values. In certain implementations, further comprising fine tuning the channels in the frequency plan to refine the default frequency values. In certain implementations, the fine tuning is carried out when a user selects a channel for viewing from the channel plan.

In another implementation, a television channel scan method involves selecting a first CEA-542-B compliant channel plan; scanning a plurality of N frequencies of the first CEA-542-B compliant channel plan to determine if any channel was detected by sequentially tuning the channels at a tuner; if at least one channel of the CEA-542-B compliant channel plan was detected, selecting all channels from the first CEA-542-B compliant channel plan as channels available for a user to tune; if no channels were detected in the N frequencies of the first CEA-542-B compliant channel plan, then selecting a second CEA-542-B compliant channel plan; scanning a plurality of M frequencies of the second CEA-542 compliant channel plan to determine if any channel was detected by sequentially tuning the channels at the tuner; if at least one channel of the CEA-542-B compliant channel plan was detected, selecting all channels from the second CEA-542-B compliant channel plan as channels available for a user to tune; if no channels were detected in the M frequencies of the second CEA-542-B compliant channel plan, then selecting a third CEA-542-B compliant channel plan; scanning a plurality of P frequencies of the third CEA-542-B compliant channel plan to determine if any channel was detected by sequentially tuning the channels at the tuner; if at least one channel of the CEA-542-B compliant channel plan was detected, selecting all channels from the third CEA-542-B compliant channel plan as channels available for a user to tune; if no channels were detected in the P frequencies of the first, second and third CEA-542-B compliant channel plan, then carrying out a complete channel scan of all channels in all three CEA-542-B compliant channel plans; wherein N, M and P are positive integers; storing an over the air (OTA) channel plan to a memory device using default frequency values; storing the selected channels in the memory device using default frequency values; carrying out a scan of the selected channel plan as a background function to refine the tuning of each available channel in the selected channel plan and omit unused channels; and fine tuning the channels a user selects a channel for viewing from the channel plan.

Any of the above methods can be implemented using one or more programmed processors storing instructions on a tangible computer readable storage medium.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). The channel map can be stored in any such device which is referred to generally herein as a memory device or a memory.

Those skilled in the art will appreciate, upon consideration of the present teaching, that the processes described above can be implemented in any number of variations and in many suitable programming languages without departing from embodiments of the present invention. For example, the order of certain operations carried out can often be varied (e.g., the order of the channel plans scanned), additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A television channel scan method, comprising:
    selecting a first CEA-542-B compliant channel plan;
    scanning a plurality of N frequencies of the first CEA-542-B compliant channel plan to determine if any channel was detected by sequentially tuning the channels at a tuner;
    if at least one channel of the CEA-542-B compliant channel plan was detected, selecting all channels from the first CEA-542-B compliant channel plan as channels available for a user to tune;
    if no channels were detected in the N frequencies of the first CEA-542-B compliant channel plan, then selecting a second CEA-542-B compliant channel plan;
    scanning a plurality of N frequencies of the second CEA-542-B compliant channel plan to determine if any channel was detected by sequentially tuning the channels at the tuner;
    if at least one channel of the CEA-542-B compliant channel plan was detected, selecting all channels from the second CEA-542-B compliant channel plan as channels available for a user to tune;
    if no channels were detected in the N frequencies of the second CEA-542-B compliant channel plan, then selecting a third CEA-542-B compliant channel plan;
    scanning a plurality of N frequencies of the third CEA-542-B compliant channel plan to determine if any channel was detected by sequentially tuning the channels at the tuner;
    if at least one channel of the CEA-542-B compliant channel plan was detected, selecting all channels from the third CEA-542-B compliant channel plan as channels available for a user to tune; and
    wherein N is a positive integer.

2. The method according to claim 1, wherein if no channels were detected in the N frequencies of the first, second and third CEA-542-B compliant channel plan, then carrying out a complete channel scan of all channels in all three CEA-542-B compliant channel plans.

3. The method according to claim 1, further comprising storing the selected channels in a memory device.

4. The method according to claim 1, further comprising storing an attribute for each channel selected in a memory device.

5. The method according to claim 1, further comprising carrying out a scan of the selected channel plan as a background function to refine the tuning of each available channel in the selected channel plan.

6. The method according to claim 1, wherein the CEA-542-B compliant channel plans comprise STD, HRC and IRC channel plans.

7. The method according to claim 1, wherein the selected channels are stored with default frequency values.

8. The method according to claim 7, further comprising fine tuning the channels in the frequency plan to refine the default frequency values.

9. The method according to claim 8, wherein the fine tuning is carried out when a user selects a channel for viewing from the channel plan.

10. The method according to claim 3, further comprising loading an over the air (OTA) channel plan to memory.

11. A tangible computer readable electronic storage medium storing instructions which, when executed on one or more programmed processors, carry out a method according to claim 1.

12. A television channel scan method, comprising:
    selecting a first CEA-542-B compliant channel plan;
    scanning a plurality of N frequencies of the first CEA-542-B compliant channel plan to determine if any channel was detected by sequentially tuning the channels at a tuner;
    if at least one channel of the CEA-542-B compliant channel plan was detected, selecting all channels from the first CEA-542-B compliant channel plan as channels available for a user to tune;
    if no channels were detected in the N frequencies of the first CEA-542-B compliant channel plan, then selecting a second CEA-542-B compliant channel plan;
    scanning a plurality of M frequencies of the second CEA-542-B compliant channel plan to determine if any channel was detected by sequentially tuning the channels at the tuner;
    if at least one channel of the CEA-542-B compliant channel plan was detected, selecting all channels from the second CEA-542-B compliant channel plan as channels available for a user to tune;
    if no channels were detected in the M frequencies of the second CEA-542-B compliant channel plan, then selecting a third CEA-542-B compliant channel plan;
    scanning a plurality of P frequencies of the third CEA-542-B compliant channel plan to determine if any channel was detected by sequentially tuning the channels at the tuner; and
    if at least one channel of the CEA-542-B compliant channel plan was detected, selecting all channels from the third CEA-542-B compliant channel plan as channels available for a user to tune; and
    wherein N, M and P are positive integers.

13. The method according to claim 12, wherein if no channels were detected in the P frequencies of the first, second and third CEA-542-B compliant channel plan, then carrying out a complete channel scan of all channels in all three CEA-542-B compliant channel plans.

14. The method according to claim 12, further comprising storing the selected channels in a memory device.

15. The method according to claim 12, further comprising storing an attribute for each channel selected in a memory device.

16. The method according to claim 14, further comprising loading an over the air (OTA) channel plan to memory.

17. The method according to claim 12, further comprising carrying out a scan of the selected channel plan as a background function to refine the tuning of each available channel in the selected channel plan.

18. The method according to claim 12, wherein the CEA-542-B compliant channel plans comprise STD, HRC and IRC channel plans.

19. The method according to claim 12, wherein the selected channels are stored with default frequency values.

20. The method according to claim 19, further comprising fine tuning the channels in the frequency plan to refine the default frequency values.

21. The method according to claim 20, wherein the fine tuning is carried out when a user selects a channel for viewing from the channel plan.

22. A tangible computer readable electronic storage medium storing instructions which, when executed on one or more programmed processors, carry out a method according to claim 1.

23. A television channel scan method, comprising:

selecting a first CEA-542-B compliant channel plan;

scanning a plurality of N frequencies of the first CEA-542-B compliant channel plan to determine if any channel was detected by sequentially tuning the channels at a tuner;

if at least one channel of the CEA-542-B compliant channel plan was detected, selecting all channels from the first CEA-542-B compliant channel plan as channels available for a user to tune;

if no channels were detected in the N frequencies of the first CEA-542-B compliant channel plan, then selecting a second CEA-542-B compliant channel plan;

scanning a plurality of M frequencies of the second CEA-542-B compliant channel plan to determine if any channel was detected by sequentially tuning the channels at the tuner;

if at least one channel of the CEA-542-B compliant channel plan was detected, selecting all channels from the second CEA-542-B compliant channel plan as channels available for a user to tune;

if no channels were detected in the M frequencies of the second CEA-542-B compliant channel plan, then selecting a third CEA-542-B compliant channel plan;

scanning a plurality of P frequencies of the third CEA-542-B compliant channel plan to determine if any channel was detected by sequentially tuning the channels at the tuner;

if at least one channel of the CEA-542-B compliant channel plan was detected, selecting all channels from the third CEA-542-B compliant channel plan as channels available for a user to tune;

if no channels were detected in the P frequencies of the first, second and third CEA-542-B compliant channel plan, then carrying out a complete channel scan of all channels in all three CEA-542-B compliant channel plans;

wherein N, M and P are positive integers;

storing an over the air (OTA) channel plan to a memory device using default frequency values;

storing the selected channels in the memory device using default frequency values;

carrying out a scan of the selected channel plan as a background function to refine the tuning of each available channel in the selected channel plan and omit unused channels; and fine tuning the channels a user selects a channel for viewing from the channel plan.

* * * * *